United States Patent

Moren

[15] 3,661,633

[45] May 9, 1972

[54] PROCESS AND COMPOSITION FOR IMPREGNATING WOOD AND WOOD PRODUCTS

[72] Inventor: Rolf Erhard Moren, Alfredshem, Sweden

[22] Filed: Jan. 26, 1970

[21] Appl. No.: 6,037

Related U.S. Application Data

[63] Continuation-in-part of Ser. No. 416,877, Dec. 8, 1964, abandoned, and a continuation-in-part of Ser. No. 347,702, Feb. 27, 1964, abandoned, and a continuation-in-part of Ser. No. 315,359, Oct. 10, 1963, abandoned, and a continuation-in-part of Ser. No. 556,783, June 10, 1966, Pat. No. 3,406,038, and a continuation-in-part of Ser. No. 598,151, Dec. 1, 1966, abandoned.

[52] U.S. Cl. ............................. 117/148, 117/59, 117/62.1, 117/116, 117/119.6, 260/33.4 R
[51] Int. Cl. ........................................................ B27k 3/50
[58] Field of Search .............................. 117/59; 260/33.4 R

[56] References Cited

UNITED STATES PATENTS

| | | | |
|---|---|---|---|
| 2,629,674 | 2/1953 | Ericks | 117/140 |
| 3,077,417 | 2/1963 | Kenaga | 117/59 |
| 2,455,961 | 12/1948 | Walker | 260/33.4 R |
| 2,664,367 | 12/1953 | Lumley | 260/33.4 R X |
| 3,387,061 | 6/1968 | Smith et al. | 260/837 X |

*Primary Examiner*—Lewis T. Jacobs

[57] ABSTRACT

Wood impregnating compositions are provided comprising a polyoxyalkylene glycol having a molecular weight within the range from about 200 to about 5,000, which is sufficiently soluble in water to form at least a 30 percent solution, and at least one thermoplastic resinous or resin forming material compatible with the glycol and capable of retaining the glycol in the wood.

A method of improving dimensional stability of natural wood by applying to the wood such a wood-impregnating composition, and wood treated with such a composition, are also provided.

2 Claims, No Drawings

PROCESS AND COMPOSITION FOR IMPREGNATING WOOD AND WOOD PRODUCTS

This application is a continuation-in-part of copending applications Ser. No. 416,877 filed Dec. 8, 1964, now abandoned; Ser. No. 347,702, filed Feb. 27, 1964, now abandoned; Ser. No. 315,359, filed Oct. 10, 1963, now abandoned; Ser. No. 556,783, filed June 10, 1966, now U.S. Pat. No. 3,406,038, and Ser. No. 598,151, filed Dec. 1, 1966, all of which applications now stand abandoned.

The present invention relates to an improved process and composition for impregnating wood and products of the wood industry.

It is known to impregnate wood with polyols. The advantage obtained by such treatment is that moist wood can be retained partially or wholly in a swollen condition during or after drying and thereby be given a more or less high degree of dimensional stability as compared to unimpregnated wood. Since the polyols usually have a high boiling point and a vapor pressure which is very low or equals zero at temperatures between 0° and 100° C., these substances remain in the wood for an indefinite time, but they can be slowly leached out by water or other solvents. When using polyol-impregnated wood outdoors or indoors, where the humidity of the air can vary from above the dew point down to a low relative humidity, the wood may, therefore, gradually lose a portion of its polyol content and hence also its dimensional stability. It is desirable that dimensionally stable wood retains its dimensional stability even if the wood is subject to the slow leaching action of water and other solvents.

In accordance with the present invention, it has surprisingly been found possible to improve considerably the retention of polyols in the wood by combining with the impregnating composition a resinous material, which at the time of impregnation is soluble in or compatible with the polyol and after the impregnation can be rendered less soluble or insoluble in water. "Compatible," as used in the sense of this invention, means that the resinous material is soluble in the polyol or is capable of forming stable dispersions in water or organic dispersing media containing polyols. Besides an improved dimensional stability the composition of this invention imparts a smoother and less paint-consuming surface to the impregnated material.

The invention is applicable to all types of wood and wood products, worked or unworked. In addition to the ends of cut logs, poles, sawed wood and machined wood articles, other products of the wood industry, e.g., veneer, plywood, laminated wood, particle board, chipboard and fiberboard, can be impregnated in accordance with this invention. A few examples of wood applications, where the invention is of particular importance are doors, doorframes, windowarches, windowframes, boat timber, shuttering, scaffolding, ladders, railroad ties and trestles, and furniture, such as garden furniture.

An important use of the composition of this invention is for impregnating shuttering and other mold material in the building art, where the materials used hitherto often have a very short life and show an undesired adherence to concrete surfaces. When casting concrete in situ to form surfaces which do not need finishing, a method which has now become a commonly used building method, the following wood products are used as facing materials for concrete molds:

1. Pinewood wedge match boarding having a planed or sawed surface.
2. Mold panels of pine having a planed surface.
3. Molds of loose timber, mold panels or lattices clad with fiberboard.
4. Mold panels of plywood,
   a. having all plies of the same wood,
   b. having a facing ply of a special wood,
   c. having their surface covered with fiberboard,
   d. having their surface coated with plastic materials.

Of the above listed mold forming materials, plywood mold panels, wherein all plies consist of pinewood, have obtained the most extensive use.

Various mold materials as above, impregnated with the composition of this invention, have shown considerably improved properties as compared to untreated materials, in particular due to improved dimensional stability, less fiber-raising in the wood surface and extraordinarily good release characteristics against fresh concrete. The reason why such a considerable improvement is obtained in this respect, is probably that those factors which in particular contribute to an undesirable adherence to the concrete surface are swelling and fiber-raising in the wood surface, which in their turn are caused by the moisture and the alkaline environment in the concrete body. This also applies to polyalcohol treated wood in which the polyol is eventually leached out by the water. When the mold is dismantled after the first use, the wood surface quickly dries again and shrinkage occurs, resulting in the formation of checks. For each subsequent casting operation, carried out on the same mold material surface, the checking in the wood increases, and the fine constituents of the concrete will enter the wood surface. The surface will be more and more damaged for each casting operation, which also adversely affects the results of the casting. Plywood, wood and fiberboard impregnated in accordance with this invention, however, do not show these disadvantages, since the wood is swelled at the outset and the polyol or derivative is retained in the wood material. Thereby, fiber raising and checking are avoided. Mold panels of plywood impregnated in accordance with this invention have considerably better properties than mold panels according to 4(d) above, which have been treated in two steps in special equipment with an expensive plastic material. Since by the present invention, in addition to the technological advantage, it is possible to reduce considerably the shrinkage loss in drying of the expensive high grade veneer which is exclusively used for making such mold panels, the total cost of the treatment per unit area will, in several embodiments of this invention, be substantially less than that of a separate treatment with plastic.

The polyols which can be used in the composition of this invention must be wholly or partially water-soluble, forming at least a 30 percent solution in water. The polyols have from two to six hydroxyl groups and a molecular weight below 5,000. The nonpolymeric polyols preferably have from two to six carbon atoms and one hydroxyl group for each carbon atom. Suitable nonpolymeric polyols include, e.g., ethylene glycol, 1,2- and 1,3- propylene glycols, and 1,3- 1,2- 2,3- and 1,4-butylene glycols, glycerol and hexitols, such as mannitol and sorbitol, and mixtures thereof. Also useful and preferred in most instances are the polymeric oxyalkylene glycols, such as polyethylene glycol, polypropylene glycol, polybutylene glycol, polyethylenepropylene glycol and polyethylenebutylene glycol, having a molecular weight up to 5,000. Exemplary are diethylene glycol, tributylene glycol, dipropylene glycol, polyethylene glycol 200, polyethylene glycol 500, polyethylene glycol 1,000 and polyethylene glycol 4,000, and mixtures thereof, such as mixtures of polyethylene glycols having a minor proportion of a 1,500 to 4,000 molecular weight solid glycol and a major proportion of a 200 to 600 molecular weight liquid glycol, sufficient to give a liquid mixture, and mixtures of a polyethylene glycol 1,000 to 4,000 molecular weight and a minor proportion of a polypropylene glycol 200 to 400 molecular weight. Among the polyethylene glycols and polypropylene glycols, those having molecular weights of between 200 and 4,000 are particularly suitable.

The resinous retention-improving agent present in the composition of this invention can be selected from any of the following groups of substances, which can be used in admixture, if desired.

A. Polymeric thermoplastic resins which as solutions or dispersions in water or an organic solvent are wholly or partially compatible with the polyol and which can be precipitated from the solution or dispersion in situ in the wood in a form which is less soluble or insoluble in water.

Examples of compositions within this group include the aqueous polyethylene dispersions marketed under the trade name "Poly-Em," and the polyacrylic acid resins sold under the trade names "Acrysol," "Acronal," and "Acronyl." Particularly suitable are the polyacrylic acid salts, e.g., ammonium and sodium polyacrylate, marketed under the trade name "Collacral" and "Rohagit." Other examples of a resin within this group are the lignin resins.

B. Natural resins, and metal compounds and esters of natural resins, which are wholly or partially compatible with the polyol and which can be converted in situ in the wood, by vaporization of solvent or otherwise, into compounds which are less soluble or insoluble in water.

Examples of such natural resins are tall oil rosin or resinate (colophony), oxidized rosin, abietic acid and esters thereof, hydrogenated rosin, ester gum, shellac, copal, acaroid, mastix, amber, elemi and dammar.

Metal compounds of natural resins include, e.g., resinates of magnesium, calcium, barium, chromium, manganese, iron, cobalt, copper, zinc, boron, aluminum and arsenic. The resin in itself provides some resistance to molds and bacteria, and some of these resinates impart, in addition to retention of the polyol, also an essential fungicidal or insecticidal action to the wood. In order to achieve an improved rapid penetration into the wood, natural resins in accordance with this invention can be used as water-soluble soaps, e.g., sodium, potassium, hydroxyalkylamine or ammonium soaps. These can subsequently be converted into an insoluble form by treatment with other metal compounds or, as regards ammonium soaps, by heat treatment. Natural resins and compounds thereof result in the porosity of the wood with respect to gases, e.g., water vapor, being none or insignificant. Esters of natural resins include in particular those obtained by esterification of, e.g., tall oil resin and colophony, with alcohols such as ethanol, butanol, alkylene glycols, polyalkylene glycols, glycerol, mannitol, sorbitol, resorcinol, phenol, pentaerythritol and sugars.

The composition of this invention includes a solvent or dispersing medium for the polyol and the resinous material, when the polyol cannot serve as the medium, and to facilitate penetration of the composition into the wood by lowering its viscosity. Suitable solvent or dispersing media include water and liquid organic solvents of low viscosity, such as alcohols, e.g., methanol, ethanol, isopropanol, butanol and 2-ethylhexanol, esters, e.g., ethyl acetate, butyl acetate, and amyl acetate, ketones, e.g., acetone, methyl ethyl ketone, methyl isobutyl ketone, and diacetone alcohol, and chlorinated hydrocarbons such as ethylene dichloride and trichloroethylene, aliphatic hydrocarbons, such as heptane, octane, decane, and aromatic hydrocarbons, such as xylene, toluene, mesitylene, chlorobenzene, dichlorobenzene, cycloaliphatic hydrocarbons such as cyclohexane, and the petroleum ethers.

The composition should contain a major proportion of polyol and a minor proportion of resinous material in a ratio of resinous material: polyol from 1:10 to 1:1, and preferably from 1:5 to 1:2.

The composition should have a sufficiently low viscosity so that it can impregnate the wood to a depth well below the surface and preferably throughout the wood. If the polyol has a sufficiently low viscosity, it can serve as the vehicle for the resinous material. If it does not, and/or if the resinous material is not soluble in or dispersible in the polyol, a solvent and/or solubility or dispersibility improver such as an emulsifier can be added.

The concentration of polyol and resinous material in the composition by way of which the wood is impregnated is determined in part by the moisture content of the wood. The objective is to form in the wood a composition having a polyol concentration of from 5 to 50 percent, and the amount of resinous material is determined by the resinous polyol ratio set out above. Thus, when moist wood is impregnated, a more concentrated composition can be applied.

The composition of this invention can also include additives serving to impart to the wood other improved properties, e.g., insecticidal, fungicidal or fire-retarding agents. It can also include water-repellent products, e.g., silicones.

The composition can be applied to wood or wood products in a moist or in a dried or partly dried condition and the wood surface can be in a crude (unworked) or worked condition. In this process, conventional methods of impregnating wood can be utilized, such as, e.g., impregnation, under normal or elevated pressure, at normal or elevated temperatures, if desired combined with a vacuum treatment before and/or after impregnation in a known manner. The impregnation can be via a prolonged immersion in a bath. Particularly suitable are alternating vacuum and high pressure impregnation, or alternating vacuum and normal pressure impregnation. Other methods of application can also be used, according to the thickness of the wood or wood product to be impregnated, e.g., manual or mechanical dipping, surface spraying, surface spreading or application by brushes, curtain machines or rollers. The composition can be applied to the wood at ambient air temperature, but it is frequently suitable to use an elevated temperature of 40° to 160° C. Particularly suitable is a temperature of 40° to 110° C., and a temperature of 50° to 90° C. is most preferable.

The insolubilization of the resinous material can be effected in many ways, e.g., by vaporization of the solvent, and/or by a heat-treatment at from 40° to 160° C.

The application of the composition of this invention can be carried out in a single step or by incremental addition. It is also possible to carry out the treatment of the wood with a polyol in a separate treatment step, and the treatment with the resinous material in a separate step, in either order. The preferred embodiment is impregnation with the polyol and the resinous material together.

In accordance with this invention, it may sometimes be suitable to carry out a heat treatment of from 40° to 160° C. after the impregnation step, e.g. to avoid addition of a hardening component, to remove any solvent present, or to dry the wood, or to achieve an improved penetration depth into the wood.

The impregnated wood and wood products that are obtained in this invention contain polyol and resinous material in a form that in effect locks in the polyol in the wood and prevents its being lost by leaching or other action. The amount of polyol based on the dry weight of the wood is within the range from about 0.5 to about 40 percent, and the amount of resinous material is within the range from about 0.05 to about 40 percent, taking into account the resinous material: polyol ratio set out above.

The following examples represent preferred embodiments of the invention.

EXAMPLE 1

In the manufacture of veneer for making plywood intended to be used for shuttering for casting concrete, the moist veneers containing 100 percent water of the weight of the dry wood were treated in a rolling machine with a 20 percent solution of American rosin (acid number = 170) in 100 percent polyethylene glycol having a molecular weight of 400 (trade name: MODO-PEG 400). Thereupon, the thoroughly impregnated veneers were dried in a conventional jet drier at a maximum temperature of 130° C. Before the veneer was cooled, there was applied by spraying a saturated aqueous solution of aluminum sulfate (temperature about 70° C.) to convert the resin in the surface layer of the veneers into insoluble aluminum resinate. The veneers were then completely dried and were used to make plywood shuttering, which showed good resistance to moisture and good release from concrete, even after storage outdoors for 6 months and after several castings.

EXAMPLE 2

Surface veneers for plywood, which in their manufacture had been thoroughly impregnated with 50 percent aqueous polyethylene glycol 1,500 solution to a polyethylene glycol content of 15 percent, based on the dry wood weight, were coated on the top surface with an aqueous dispersion of polyethylene marketed under the trade name "Poly-Em 20017." This dispersion has a solids content of 40 percent and contains about .6 percent of nonionic dispersing agent. The polyethylene has a molecular weight of between 25,000 and 28,000. The particle size of the dispersion is less than 10 microns. The emulsion is stable within the pH range of 1 to 12. After drying in a roll drier at a temperature of not above 135° C., the treated veneer was used to make plywood shuttering for casting concrete. The resulting product was found, in practical tests, to give a considerably improved release from fresh concrete and also to posses a considerably extended useful life, as compared to untreated plywood.

EXAMPLE 3

Dried wood was impregnated by immersion for one minute in 100 percent polyethylene glycol of molecular weight 400 to an amount of 5 percent based on the dry wood weight. The impregnated wood was dried again, and then, before cooling, was impregnated by immersion in a solution containing (in parts by weight):

| | |
|---|---|
| Linseed oil | 20 |
| Rosin | 10 |
| Ethyl alcohol | 20 |
| Kerosene | 60 |

This treating composition imparted a good water-repellency to the polyethylene glycol-treated wood.

EXAMPLE 4

| | |
|---|---|
| Polyethylene glycol (100%) of molecular weight 600 (MODO-PEG 600) | 70% by weight |
| Portuguese rosin | 25% by weight |
| Ammonia | 5% by weight |

The above composition was used in an amount of 5 percent (based on the dry weight) for impregnation of wallboard with the cold solution in a rolling machine immediately after compression of the board at 160° C. The resulting board had a high dimensional stability that was retained on storage outdoors for more than 2 months, and a very low degree of paint absorption in the surface layer on painting.

EXAMPLE 5

Dried mahogany veneer was impregnated in a rolling machine at 50° C. with a solution of 75 parts by weight of polyethylene glycol 1,000 and 25 parts by weight of methacrylic acid methyl ester and 0.5 part by weight of benzoyl peroxide in an amount of 5 percent based on the dry veneer weight. After heat treatment for 1 hour at 50° C. the polymerization was completed by treatment at 80° C. for 2 hours. By this treatment a veneer was obtained, which had considerably improved dimensional stability as compared to untreated veneer, good weather resistance and resistance to chemicals.

EXAMPLE 6

Freshly sawed pine wood boards were immersed in hot water (temperature about 90° C.) for 2 hours. Thereupon, the wood was impregnated by immersion in an open tank for 2 hours with an aqueous solution containing 10 percent by weight of polyethylene glycol 1,000, 2 percent by weight of a fungicide called "Celcure" (copper sulfate, sodium bichromate, chromium acetate) and 4 percent by weight of ammonium resinate. After drying a wood was obtained which had considerably improved dimensional stability as compared to untreated wood and a good resistance to mold and moisture.

EXAMPLE 7

Dried pine veneer was impregnated in a glue spreading machine with a solution of 25 percent tall oil rosin in a 50:50 mixture of diethylene glycol and diethylene glycol monoethyl ether at a temperature of 80° C. to an amount of 6 percent based on the dry weight of the veneer. After heat treatment of the veneer at 60° C., plywood for concrete shuttering panels was made from the veneer. Such mold panels showed a long life and good release from concrete.

EXAMPLE 8

Freshly sawed beechwood planks were treated by dipping for 30 seconds in a 20 percent solution of ammonium resinate in diethylene glycol until the wood had taken up 6 percent based on the dry wood weight. Due to this treatment, the wood could be dried without checking more rapidly at a higher temperature than the corresponding untreated wood. The treated wood showed no tendency to exude the glycol with steam liberated in the drying step.

EXAMPLE 9

Air-dried finished wood for window frames was pressure-impregnated with a solution containing 10 percent by weight of polyethylene glycol 1,500, 5 percent by weight of ammonium resinate and 2 percent by weight of an impregnating agent marketed under the trade name "Cuprinol" and comprising copper sulfate and sodium pentachlorophenate. After drying, the wood had excellent dimensional stability and resistance to moisture and mold.

EXAMPLE 10

Freshly turned pinewood veneer was impregnated in a rolling machine with a solution of 50 percent by weight of polyethylene glycol 1,000, 0.5 percent by weight of sodium pentachlorophenate and 10 percent by weight of polyacrylic acid marketed under the trade name "Acrafloc WF." The veneer was dried at 135° C. in a roll drier. Shrinkage after drying was reduced by about 50 percent and also, the veneer showed a reduced tendency to check and a good resistance to moisture and mold after storage of 1 year.

EXAMPLE 11

Freshly sawed pinewood boards were treated by dipping for a period of 4 hours at a temperature of between 90° and 100° C. in a solution consisting of 85 parts by weight of water, 10 parts by weight of polyethylene glycol 800 and 10 parts by weight of a fire-retardant for wood marketed by Borax Consolidated Ltd. under the trade name "Polybor" and consisting of a 2:3 mixture of boric acid and borax.

Immediately upon this treatment, the wood was dipped for 2 minutes in a solution consisting of 10 parts by weight of ammonium resinate, 10 parts by weight of polyethylene glycol 800 and 80 parts by weight of water. Drying resulted in a wood which had considerably improved dimensional stability as compared to untreated wood, was flame-resistant and insensitive to mold, after storage for 1 year.

EXAMPLE 12

Machined wood for making wood patterns for metal casting was treated by vacuum-pressure impregnation with a 20 percent aqueous solution of polyethylene glycol 1,000 to take up 18 percent by weight based on the dry wood. Thereupon the wood was dried at a temperature of about 60° C. to a moisture content of about 8 percent. The hot wood was dipped for 15 minutes in a 20 percent polyethylene dispersion ("Poly-Em 20017") and was then dried at 70° C.

Casting patterns made from this pattern wood showed a considerably improved dimensional stability and an excellent release from the mold surface as compared to patterns made from untreated wood, even after continuous use for 2 months.

EXAMPLE 13

An impregnating composition for wood and plywood for outdoor use was made according to the following formula (in percent by weight):

| | |
|---|---|
| 100% polyethylene glycol of molecular weight 1500 ("MODO-PEG 1500") | 15% |
| 30% polyacrylic acid dispersion ("Rohagit SD15") | 5% |
| Water | 80% |

This treating composition which also has a swelling action on the surface layer and makes the surface more water-repellent, is particularly suitable for treatment of wood which tends to check on exposure to sunlight.

Window sashes which were thoroughly impregnated by pressure impregnation in this composition for 30 minutes at room temperature and then dried at 50° C. for 4 days, showed a good resistance to moisture and a reduced tendency to swelling in moist air, even after storage for 1 year.

Having regard to the foregoing disclosure, the following is claimed as the inventive and patentable embodiments thereof:

1. Wood products impregnated with a wood-impregnating composition comprising an at least partially water-soluble polyoxyalkylene glycol having a molecular weight within the range from about 200 to about 5,000, and from two to six hydroxyl groups, and at least one thermoplastic synthetic resinous polymeric material that is compatible therewith and capable of being deposited in the wood in resinous water-insoluble form, thereby improving the retention of the polyol in the wood; the ratio of thermoplastic synthetic resinous material:polyoxyalkylene glycol being within the range from 1:10 to 1:1, the impregnation being carried out by application of the composition to the wood at a temperature within the range from about 25° C. to about 160° C., and a pressure at which penetration of the wood by the composition is obtained.

2. Wood products in accordance with claim 1, in which the polyol comprises from about 0.5 to 40 percent of the dry weight of the wood treated.

* * * * *